J. W. McGlashan. Purifying & Evaporating Hot Air Register.
No. 116337    Fig. 1.    Patented Jun 27 1871
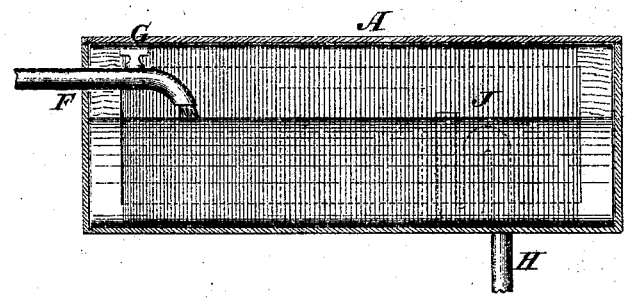
Fig. 2.
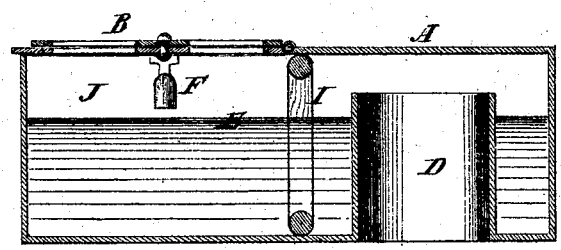
Fig. 3.
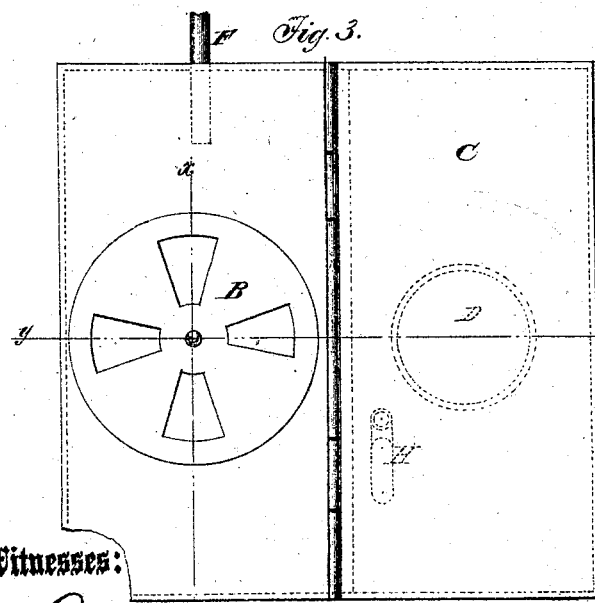
Witnesses:
Gustave Dieterichs
Wm. H. C. Smith.
Inventor:
J. W. McGlashan.
per
Attorneys.

UNITED STATES PATENT OFFICE.

JOHN W. McGLASHAN, OF MONTREAL, CANADA.

IMPROVEMENT IN HOT-AIR REGISTERS.

Specification forming part of Letters Patent No. 116,337, dated June 27, 1871.

*To all whom it may concern:*

Be it known that I, JOHN W. MCGLASHAN, of Montreal, in the Province of Quebec and Dominion of Canada, have invented a new and useful Improvement in Purifying and Evaporating Hot-Air Register; and I do hereby declare that the following is a full, clear, and exact description thereof, which will enable others skilled in the art to make and use the same, reference being had to the accompanying drawing forming part of this specification.

The object of this invention is to provide for the use of the public a cheap and easily-regulated apparatus, designed to take the place and perform the functions of the ordinary furnace or hot-air register now used, and also act as an evaporator and a purifier of the air passing through it. To this end it consists of a tank or water-tight case, provided with a hinged top having a register, also with air-inlet, and water-eduction and discharge-pipes and a removable screen, and otherwise adapted for its intended uses. The water may be allowed to flow constantly through the tank, or at intervals only, and the sediment from dust, &c., can be easily removed.

In this connection I desire to state I am well aware that a dust-screen arranged in a water-tank, so as to be kept wet by capillarity, has been long known and used. To this, therefore, as to any other special or single feature of my invention, I make no claim, separately.

In the accompanying drawing, Figure 1 represents a vertical section of the arrangement taken on the line *x x* of Fig. 3. Fig. 2 is a section of Fig. 3 taken on the line *y y*. Fig. 3 is a top or plan view.

Similar letters of reference indicate corresponding parts.

A represents a water-tank or vessel of rectangular form, in the top of which is the register B. This portion of the top is hinged to the other portion, C, so that it can be raised for inspecting the interior and adjusting the screw. The heated air is introduced into the water-tank A through the bottom and discharged near the top by means of the pipe D. E represents the water-line in the tank. Water is introduced through the pipe F, the quantity being regulated by the cock G. H is a discharge-pipe passing through the bottom of the tank and forming in the chamber a trap, as seen in dotted lines in Fig. 1. The top of this pipe corresponds in height with the water-line E. I represents a removable screen or dust-arrester, formed of a frame covered with yarn or thread, or with any suitable textile or fibrous material which will absorb water and act as a capillary. The lower portion of the screen is immersed in the water. Its upper portion forms a partition in the air-space J above the water, as represented in Fig. 2. It will be seen that the heated air must, by this arrangement, pass through the saturated screen to reach the register. The water is more or less heated by contact with the hot-air pipe. Water will consequently be evaporated constantly, and such vapor will be absorbed by the air. Any light dust or other impurities held in suspension will be separated in passing through the screen, and the air will be rendered most pleasant and healthful by the watery vapor absorbed.

By this arrangement the great objections to hot-air furnaces (the dryness and unhealthiness of the air discharged therefrom) are obviated. There may be a constant admission and discharge of water into and from the tank. The screen or dust-arrester is readily removed for washing or cleansing. The tank is placed directly beneath the floor, or in any convenient location.

Having thus described my invention I claim as new and desire to secure by Letters Patent—

The improved hot-air register and purifier and evaporating apparatus, formed of the rectangular case A provided with a hinged top, the register B, inwardly-projecting air-pipe D, water-pipes F, G, and H, and the removable screen I, all arranged as shown and described.

J. W. McGLASHAN.

Witnesses:
GEORGE CARTER,
*Of Montreal, Notarial Clerk.*
J. S. HUNTER,
*Of Montreal, Notary Public.*